(12) United States Patent
Campbell

(10) Patent No.: US 9,180,819 B2
(45) Date of Patent: Nov. 10, 2015

(54) INTERIOR REARVIEW MIRROR ASSEMBLY WITH INTEGRATED INDICATOR SYMBOL

(75) Inventor: Douglas C. Campbell, Northville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 438 days.

(21) Appl. No.: 12/885,191

(22) Filed: Sep. 17, 2010

(65) Prior Publication Data

US 2012/0068839 A1 Mar. 22, 2012

(51) Int. Cl.

| | |
|---|---|
| *B60Q 1/00* | (2006.01) |
| *H04Q 1/30* | (2006.01) |
| *G08B 5/22* | (2006.01) |
| *G08B 21/00* | (2006.01) |
| *G08B 5/00* | (2006.01) |
| *B60R 1/12* | (2006.01) |
| *B60R 1/04* | (2006.01) |

(52) U.S. Cl.
CPC ... *B60R 1/12* (2013.01); *B60R 1/04* (2013.01); *B60R 2001/1215* (2013.01)

(58) Field of Classification Search
CPC ............ B60R 1/12; B60R 2021/01554; B60R 2022/4866; B60R 25/241; B60R 25/246; B60Q 1/323; E05B 17/10; G05B 2219/25236
USPC ................... 340/438, 425.5, 815.45; 362/494
See application file for complete search history.

(56) References Cited

U.S. PATENT DOCUMENTS

| | | | |
|---|---|---|---|
| 5,604,644 A | 2/1997 | Lang et al. | |
| 5,878,353 A * | 3/1999 | ul Azam et al. | 455/566 |
| 7,253,723 B2 * | 8/2007 | Lindahl et al. | 340/438 |
| 7,488,080 B2 | 2/2009 | Skiver et al. | |
| 8,886,399 B2 * | 11/2014 | El Dokor | G06F 3/017 345/158 |
| 2002/0044065 A1 * | 4/2002 | Quist et al. | 340/815.4 |
| 2003/0195035 A1 * | 10/2003 | Onuki et al. | 463/20 |
| 2004/0160657 A1 | 8/2004 | Tonar et al. | |
| 2005/0195488 A1 | 9/2005 | McCabe et al. | |
| 2005/0264891 A1 * | 12/2005 | Uken et al. | 359/606 |
| 2006/0158351 A1 | 7/2006 | Lee et al. | |
| 2006/0255960 A1 * | 11/2006 | Uken et al. | 340/815.4 |
| 2007/0085157 A1 * | 4/2007 | Fadell et al. | 257/428 |
| 2007/0124694 A1 * | 5/2007 | Van De Sluis | G06F 3/017 715/775 |
| 2007/0228263 A1 * | 10/2007 | Shen et al. | 250/221 |
| 2008/0055757 A1 | 3/2008 | Uken et al. | |
| 2008/0147321 A1 * | 6/2008 | Howard et al. | 701/211 |
| 2009/0067032 A1 | 3/2009 | Varaprasad et al. | |
| 2009/0096937 A1 * | 4/2009 | Bauer et al. | 348/739 |
| 2009/0115631 A1 | 5/2009 | Foote et al. | |
| 2009/0195376 A1 * | 8/2009 | Miller et al. | 340/457.1 |
| 2009/0201690 A1 | 8/2009 | Boivin et al. | |
| 2009/0231741 A1 | 9/2009 | Weller et al. | |
| 2009/0243824 A1 * | 10/2009 | Peterson et al. | 340/435 |

(Continued)

FOREIGN PATENT DOCUMENTS

| | | |
|---|---|---|
| EP | 2042373 A | 4/2009 |
| JP | 01289725 A2 | 11/1989 |

*Primary Examiner* — Steven Lim
*Assistant Examiner* — Muhammad Adnan
(74) *Attorney, Agent, or Firm* — Price Heneveld LLP; Scott P. Ryan

(57) ABSTRACT

An interior rearview mirror assembly for vehicles relating to interior rearview mirror assemblies without a frame or bezel having inputs corresponding to elements representing a symbol. The symbols are located behind a reflective element and not visible until activated by selection of the corresponding input or other means.

25 Claims, 3 Drawing Sheets

(56) References Cited

U.S. PATENT DOCUMENTS

| | | |
|---|---|---|
| 2009/0251913 A1 | 10/2009 | Bruhnke et al. |
| 2010/0007463 A1* | 1/2010 | Dingman et al. ............ 340/5.72 |
| 2010/0097469 A1 | 4/2010 | Blank et al. |
| 2012/0110511 A1* | 5/2012 | Howard ........................ 715/835 |
| 2012/0182242 A1* | 7/2012 | Lindahl et al. ................ 345/173 |

* cited by examiner

INTERIOR REARVIEW MIRROR ASSEMBLY WITH INTEGRATED INDICATOR SYMBOL

TECHNICAL FIELD

This invention relates generally to interior rearview mirror assemblies for vehicles and, more particularly, to interior rearview mirror assemblies without a frame or bezel having inputs corresponding to a symbol.

BACKGROUND OF THE INVENTION

Conventional systems for controlling appliances and devices, such as garage door openers, security gates, home alarms, lighting, computers, etc., use individual remote controls to operate a respective appliance and/or device. With this conventional system, it is difficult to control multiple devices or appliances, much less consolidate operation of the appliances and devices into a single, controllable system. For example, garage door opener mechanisms open and close a garage door in response to a radio frequency control signal. The control signal is typically generated and transmitted from a remote control that is sold with the garage opener. The control signal has a preset carrier frequency and control code such that the garage door opener mechanism is responsive only to the remote control issuing the associated control signal. A problem associated with this type of system is that the door opener must receive a specific predetermined control signal in order to be operated. That is, each appliance and device must receive a specific predetermined control signal. Therefore, a user wishing to control multiple appliances and/or devices is required to have multiple remote controls.

Communication systems currently exist which enable multiple appliances and devices to communicate with a central or single remote device. One such system is Homelink™ owned by Johnson Control's, Inc., in which a trainable transceiver is able to "learn" characteristics of received control signals such that the trainable transceiver may subsequently generate and transmit a signal having the learned characteristics to a remotely controlled device or appliance. For example, one such system is disclosed in U.S. Pat. No. 5,854,593, hereby incorporated by reference. Another such system is disclosed in EP Pat. No. 0 935 226 B1, also hereby incorporated by reference.

FIG. 1 illustrates an example of an electrical circuit of a trainable transceiver in block and schematic form. Trainable transceiver 43 includes a conventional switch interface circuit 49 connected to one terminal of each of the push button switches 44, 46, and 47. In addition to microcontroller 57, transceiver circuit 55 includes a radio frequency (RF) circuit 58 coupled to microcontroller 57 and to an antenna 59. Each of switches 44, 46, and 47 may each correspond to a different device or appliance to be controlled such as different garage doors, electrically operated access gates, house lighting controls or the like, each of which may have their own unique operating RF frequency, modulation scheme, and/or security code. Thus, switches 44, 45, and 47 correspond to a different radio frequency channel for trainable transceiver 43.

Systems, such as those described above, may be incorporated as a feature into a vehicle to provide users with easy access to wireless devices and appliances. Once such embodiment is illustrated in FIG. 2, which shows an interior rearview mirror assembly. Interior rearview mirror 10 has a reflective surface 11 encased in a frame or bezel 12. User inputs 18a correspond, for example, to switches 44, 46 and 47 of FIG. 1 and likewise operate a different device or appliance to be controlled. Appearing on each of the inputs 18a is a logo, icon, indicia or graphics, such as a vehicle logo, and may have other appearances as desired. For example, the Homelink™ icon appears on three of the four user inputs 18a, each of which may be backlit with one or more illumination sources or LEDs. Selection of a user input 18a operates to backlight the input, indicating selection of the corresponding user input 18a. Alternatively, as illustrated, each user input 18a may not be backlit, but instead illuminates LED 22 when selected.

SUMMARY OF THE INVENTION

In general terms, this invention relates to interior rearview mirror assemblies for vehicles and, more particularly, to interior rearview mirror assemblies without a frame or bezel having inputs corresponding to a symbol.

In one embodiment of the invention, there is an interior rearview mirror assembly for a vehicle, including a reflective element; a mirror housing to support the reflective element; at least one user input disposed on the mirror to operate at least one symbol disposed behind the reflective element.

In one aspect of the invention, the at least one symbol is illuminated by at least one illumination source when activated.

In another aspect of the invention, the at least one symbol is activated by at least one of the following conditions: selection of the at least one user input, starting an ignition of the vehicle, opening of a vehicle door, status of the headlamps, user activated feature and sensing user movement.

In still another aspect of the invention, the reflective element is transflective such that the at least one symbol is visible upon activation and hidden upon deactivation.

In another embodiment of the invention, wherein an intensity of the at least one illumination source is dependent on at least one of sensitivity of ambient light, status of the headlamps, and intensity of vehicle dashboard lighting.

In still another aspect of the invention, the at least one symbol is a single indicator.

In yet another aspect of the invention, wherein the at least one symbol is located such that it illuminates a portion of an edge of the reflective element.

In still another aspect of the invention, wherein the at least one symbol is a single symbol that corresponds to each of the at least one user inputs.

In another aspect of the invention, wherein for each of the at least one user inputs there is a corresponding at least one symbol.

In yet another aspect of the invention, the at least one symbol is a multi-color symbol configured to indicate various functions corresponding to a controllable device actuated by the at least one user input.

In another aspect of the invention, the at least one symbol is a reconfigurable display.

In still another aspect of the invention, the at least one illumination source is at least one of: a light emitting diode, organic light emitting diode, inorganic light emitting diode, electroluminescent light emitting junction, element and multiple elements.

In yet another aspect of the invention, the reflective element is not supported by a bezel.

In another aspect of the invention, the symbols are configured to illuminate for a predetermined or user selectable amount of time.

In yet another aspect of the invention, the conditions to activate the at least one symbol are defined by a user.

In another embodiment of the invention, there is a mirror system of a vehicle, including an interior rearview mirror assembly including a reflective element, a mirror housing to support the reflective element, at least one user input disposed on the mirror to operate at least one symbol disposed behind the reflective element, wherein the reflective element is a transflective element such that the at least one symbol is visible upon activation and hidden during deactivation.

These and other features and advantages of this invention will become more apparent to those skilled in the art from the detailed description of a preferred embodiment. The drawings that accompany the detailed description are described below.

BRIEF DESCRIPTION OF THE DRAWINGS

FIG. 5b shows an exploded view of an element appearing on the interior rearview mirror assembly of FIG. 5a.

DETAILED DESCRIPTION OF A PREFERRED EMBODIMENT

The invention relates to interior rearview mirror assemblies for vehicles and, more particularly, to interior rearview mirror assemblies without a frame or bezel having selectable inputs or buttons corresponding to a reflective element displayed on a reflective surface of the interior rearview mirror.

Figure 1:
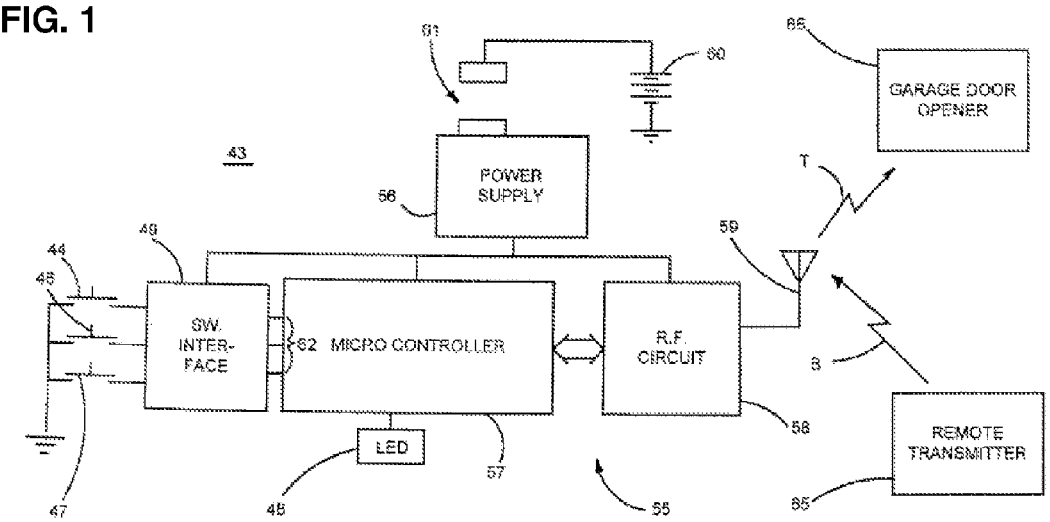
FIG. 1 illustrates an example of an electrical circuit of a trainable transceiver in block and schematic form.
Figure 2:
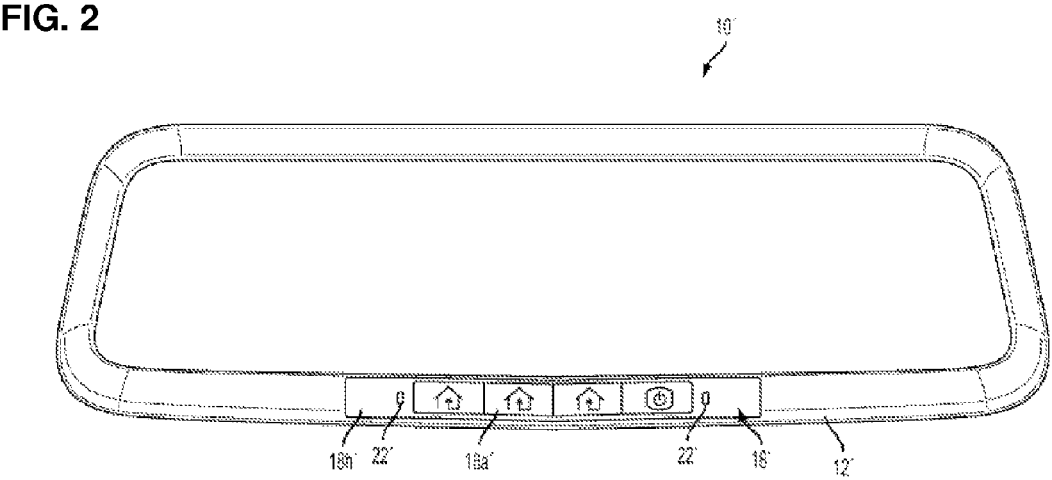
FIG. 2 shows an interior rearview mirror assembly in accordance with the prior art.
Figure 3:
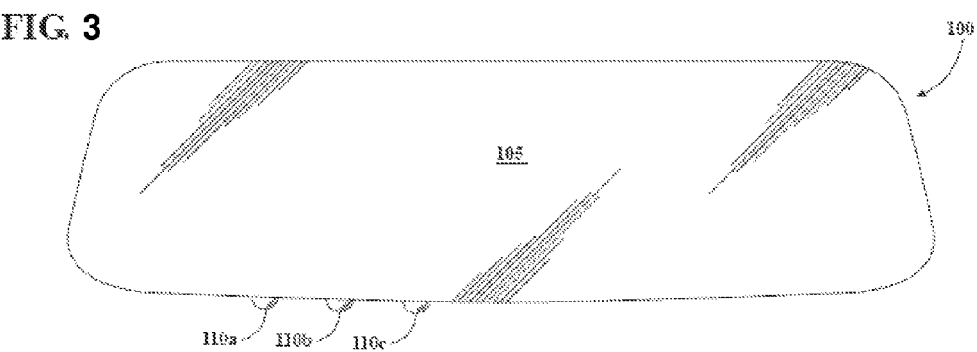
FIG. 3 shows an exemplary interior rearview mirror assembly in accordance with one embodiment of the invention.

FIG. 3 shows an exemplary interior rearview mirror assembly in accordance with one embodiment of the invention. An interior rearview mirror assembly 100 for a vehicle includes a reflective element 105 and inputs 110a, 110b and 110c. The reflective element 105 may be partially transmissive, partially reflective, transflective, etc. such that objects behind the element may be viewed, while at least partially maintaining the reflectivitiy of the element to act as a mirror. Moreover, the reflective element may be electrochromatic or any other type of reflective element as readily understood in the art. The mirror assembly 100 does not have a traditional frame or bezel, contrary to the conventional mirror illustrated in FIG. 2. That is, the mirror assembly appears without a retaining bezel and provides full reflectivity on the face of the reflective element 105. Without a retaining or structurally supporting bezel, the inputs (or buttons) 110a, 110b and 110c may no longer be located on the bezel itself. Rather, the inputs 110a, 110b and 110c are relocated to the structure or housing now supporting the reflecting element 105, as illustrated. It is understood that the number of inputs and location of the inputs is not limited to the depicted embodiment, but may include any number of inputs and any location as readily understood by the skilled artisan.

Similar to the conventional mirror assembly discussed above, appearing on each of the inputs 110a, 110b and 110c is a logo, icon, indicia or graphics, such as a vehicle logo, and may have other appearances as desired. For example, the Homelink™ icon appears on the inputs 110a, 110b and 110c, each of which may be backlit with one or more illumination sources or LEDs. However, given the new location of the inputs 110a, 110b and 110c, it becomes difficult for a user (e.g. driver) to see the backlit input (or a separate indicator light).

Figure 4:
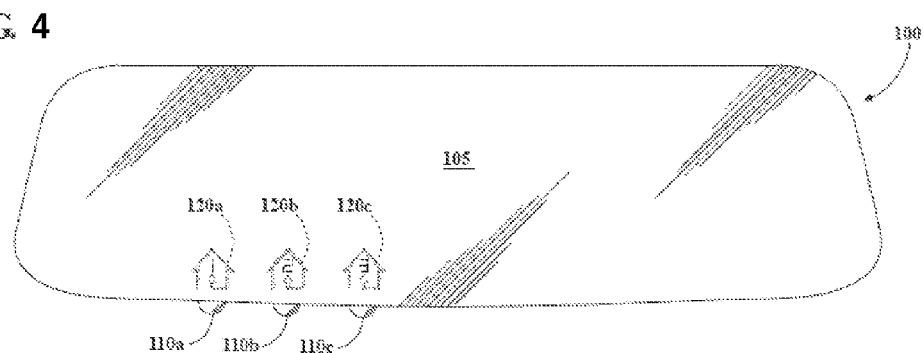
FIG. 4 shows an exemplary interior rearview mirror assembly in accordance with one embodiment of the invention.

FIG. 4 shows an exemplary interior rearview mirror assembly in accordance with one embodiment of the invention. The mirror assembly 100 includes, for example, reflective element 105, inputs 110a, 110b and 110c, and symbols 120a, 120b and 120c. Illumination elements or sources (not depicted) are disposed behind reflective element 105, and include a display device or element, such as an illumination source in the form of a light emitting diode (LED) or an arrays of LEDs, multi-color LEDs or a multi-color display or similar and/or corresponding circuitry. The illuminations sources, when illuminated, form symbols 120a, 120b and 120c which are readily visible through the reflective element 105 when any one of the illumination sources are activated. The illuminations sources may be separate from the symbols (e.g. the illumination sources act to illuminate the symbols), or part of the symbols (e.g. the illuminations sources are also the symbols themselves). It is therefore understood that the terms illumination sources and symbols may be interchangeable or separate elements. The symbols 120a, 120b and 120c are activated and deactivated, for example, by user or automatic selection of a corresponding input 110a, 110b and 110c, start of an ignition in the vehicle, opening of a vehicle door, etc. The user may select and determine which of the aforementioned systems enable activation of the symbols, as well as the length of activation of the symbols. The symbols may also act as an indicator to indicate that a device or appliance operated by inputs 110a, 110b and 110c is being controlled, as well as provide the status of the device. The illumination sources may be disposed at a circuit element, such as a printed circuit board, and the circuit element may include or support or be connected to circuitry associated with the illuminations sources and/or display device, dimming control or any other accessory or system associated with the mirror assembly 100 in the vehicle. Moreover, the brightness and color of the illumination sources and/or symbols when activated are not limited to a single level. Rather, brightness and color may be tied to various factors, such as amount of ambient light, user selection, headlamp status, user movement or any other factor. Ambient light may also determine the intensity of the illumination source and/or symbol. It is also appreciated that the illumination sources and/or symbols may be in any form, shape or pattern, including characters, symbols, numbers, etc., and are not limited to the specific embodiments illustrated in the drawings.

Figure 5A:
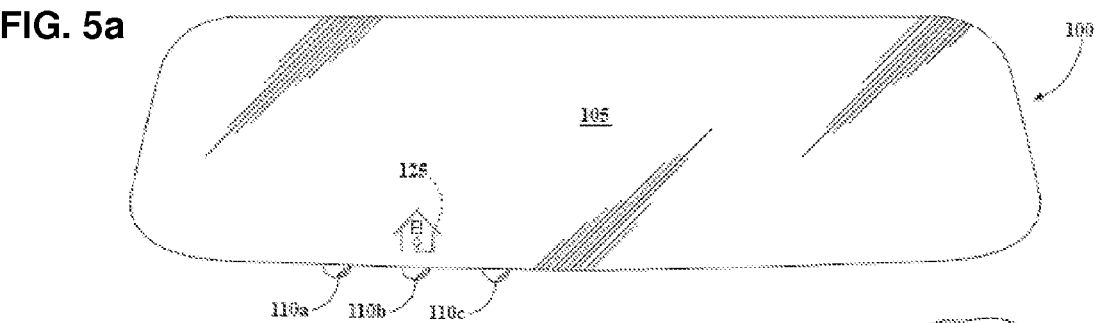
FIG. 5a shows an exemplary interior rearview mirror assembly in accordance with one embodiment of the invention.

FIG. 5a shows an exemplary interior rearview mirror assembly in accordance with one embodiment of the invention. In this embodiment, the interior rearview mirror assembly 100 is similar to that described with respect to FIG. 4. However, instead of providing multiple symbols 120a, 120b and 120c that correspond to each of inputs 110a, 110b and 110c, respectively, this embodiment discloses a single symbol 125 that is configured to be used with any one of or all inputs 110a, 110b and 110c. That is, symbol 125 may also include an indicator, such as an LED, that is also operable to indicate selection of one of inputs 110a, 110b or 110c. For example, if input 110a is selected, symbol 125 is activated such that it becomes visible to the user from behind reflective element 105. Additionally, the symbol 125 displays a number (depicted in the illustrated embodiment) that corresponds to input 110a. However, symbol 125, which may be an LED, may be illuminated to provide the number "1," which number corresponds to input 110a. Additionally, the input(s) may correspond to a specific device or appliance, such as garage door, lights, etc., or indicative of the status of any device or appliance being controlled. Similar to the embodiment illustrated in FIG. 4, the displayed symbol 125 may be substantially or completely hidden (i.e. not visible) to a person viewing the mirror assembly 100 when the mirror assembly is mounted in the vehicle, and when the symbol 125 is not activated. This enables the mirror assembly 100 to be fully utilized as a rearview mirror without distraction on part of a user.

Figure 5B:
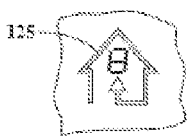

FIG. 5b shows an exploded view of an element appearing on the interior rearview mirror assembly of FIG. 5a. In the illustrated embodiment, in addition to symbol 125 illuminating during activation as described above, symbol 125 may also have a reconfigurable display, for example a seven-segment indicator (represented by the "8" in the drawings) that is capable of indicating which of the corresponding inputs 110a, 110b and 110c (which inputs correspond to a device or appliance, as described above) has been selected. The symbol 125 and reconfigurable display may be activated/deactivated together or separately to create different visual responses. Additionally, the color (or multiple colors), brightness, activity, etc. of the symbol 125 and the reconfigurable display may be the same or provided differently for visual response or otherwise. Text, characters, symbols, etc. may also be displayed as part of symbol 125 and/or the reconfigurable display. Moreover, the reconfigurable display may be any display as readily understood in the art, including segmented, dot matrix, TFT, LCD, etc. Symbol 125 may also be configured to illuminate for a predetermined or user selectable amount/length of time.

Figure 6:
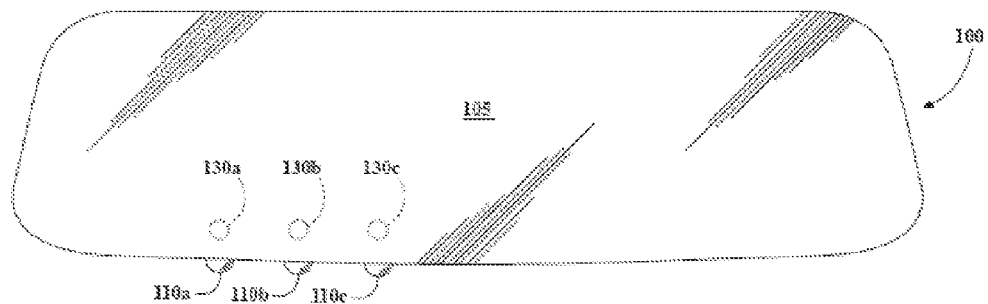
FIG. 6 shows an exemplary interior rearview mirror assembly in accordance with one embodiment of the invention.

FIG. 6 shows an exemplary interior rearview mirror assembly in accordance with one embodiment of the invention. Although the indicators 130a, 130b and 130c, as illustrated in this embodiment, are displayed (when activated) as a single LED, the indicator(s) may appear in any desired shape or pattern, and in any color. Additionally, the indicator(s) may have a brightness that varies with ambient light or is set to a desired level. While LED(s) are used as the indicator 130a, 130b and 130c in the preferred embodiment, it is appreciated that any type of illumination source may be used. For example, an organic or inorganic light emitting diode, electroluminescent light emitting junction or element or multiple elements may be included and located at, or disposed at or behind the reflective element 105. It is also appreciated that the indicators may be located anywhere behind the reflective element 105, including along the edge of the reflective element 105, thereby intentionally lighting the edge of the reflective element 105 in a specific area.

The illumination sources and/or symbols located behind the reflective material 105 may also be touch sensitive. The symbols can use non-contact technology (for example, optical, capacitive, resistive) to determine user proximity to the reflective element 105 and activation of the inputs 110a, 110b and 110c. The symbol(s) can be visible all the time or only when the illumination source (e.g. LED back light) is activated. If not visible, the symbol can be lit (made visible) for a variable period of time based on another input from the vehicle, such as opening the door, turning on interior lights, starting the car, etc. which will allow the user to recognize this hidden feature. The method of activation and length of time could be programmable by a user, such as from a vehicle message center. The entire symbol or a portion of the symbol (such as the center of the symbol) can be backlit by a single monochrome LED, use a multi-color display, or any other method known in the art.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. An interior rearview mirror assembly for a vehicle, comprising:
   a reflective element not supported by a bezel;
   a mirror housing to support the reflective element;
   at least one user input; and
   at least one symbol disposed behind the reflective element for representing a function to be performed upon actuation of the at least one user input,
   wherein the at least one user input is configured to determine user proximity to the reflective element and activate and thereby change the appearance of the at least one symbol upon sensing user movement,
   wherein the at least one symbol is illuminated by at least one illumination source when activated,
   wherein the reflective element is transflective such that the at least one symbol is visible upon activation and hidden upon deactivation, and
   wherein the at least one symbol is activated after at least one of the following conditions: starting an ignition of the vehicle, opening of a vehicle door, and depending upon status of headlamps of the vehicle.

2. The mirror assembly of claim 1, wherein an intensity of the at least one illumination source is dependent on at least one of sensitivity of ambient light, status of the headlamps, and intensity of vehicle dashboard lighting.

3. The mirror assembly of claim 1, wherein the at least one symbol is a single indicator.

4. The mirror assembly of claim 1, wherein the at least one symbol is located such that it illuminates a portion of an edge of the reflective element.

5. The mirror assembly of claim 1, wherein the at least one symbol is a single symbol that corresponds to each of the at least one user input.

6. The mirror assembly of claim 1, wherein for each of the at least one user input there is a corresponding at least one symbol.

7. The mirror assembly of claim 1, wherein the at least one symbol is a multi-color symbol configured to indicate various functions corresponding to a controllable device actuated by the at least one user input.

8. The mirror assembly of claim 1, wherein the at least one symbol is a reconfigurable display.

9. The mirror assembly of claim 1, wherein the at least one illumination source is at least one of: a light emitting diode, organic light emitting diode, inorganic light emitting diode, electroluminescent light emitting junction, element and multiple elements.

10. The mirror assembly of claim 1, wherein the at least one symbol is configured to illuminate for a predetermined or user selectable amount of time.

11. The mirror assembly of claim 1, wherein the conditions to activate the at least one symbol are defined by a user.

12. The mirror assembly of claim 1 wherein the symbol is activated upon sensing user movement.

13. The mirror assembly of claim 1 further including at least one illumination source and wherein said at least one illumination source is activated upon sensing user movement.

14. A mirror system of a vehicle, comprising:
   an interior rearview mirror assembly including a reflective element not supported by a bezel, a mirror housing to support the reflective element, at least one user input, and at least one symbol disposed behind the reflective element for representing a function to be performed upon actuation of the at least one user input, wherein the reflective element is a transflective element such that the at least one symbol is visible upon activation and hidden during deactivation and wherein the at least one symbol is activated by sensing user movement, wherein the at least one symbol is illuminated by at least one illumination source when activated, and wherein the at least one symbol is activated after at least one of the following conditions: starting an ignition of the vehicle, opening of a vehicle door, and depending upon status of headlamps of the vehicle.

15. The mirror system of claim 14, wherein the at least one symbol is backlit by the at least one illumination source.

16. The mirror system of claim 15, wherein an intensity of the at least one illumination source is dependent on at least one of sensitivity of ambient light, status of the headlights, and intensity of vehicle dashboard lighting.

17. The mirror system of claim 15, wherein the at least one symbol is a single indicator.

18. The mirror system of claim 15, wherein the at least one symbol is located such that it illuminates a portion of an edge of the reflective element.

19. The mirror system of claim 14, wherein the at least one symbol is a single symbol that corresponds to each of the at least one user input.

20. The mirror system of claim 14, wherein for each of the at least one user input there is a corresponding at least one symbol.

21. The mirror system of claim 14, wherein the at least one symbol is a multi-color symbol configured to indicate various functions corresponding to a controllable device actuated by the at least one user input.

22. The mirror system of claim 14, wherein the at least one symbol is a reconfigurable display.

23. The mirror system of claim 14, wherein the at least one illumination source is at least one of: a light emitting diode, organic light emitting diode, electroluminescent light emitting junction, element and multiple elements.

24. The mirror assembly of claim 14, wherein the at least one symbol is configured to illuminate for a predetermined or user selectable amount of time.

25. The mirror assembly of claim 14, wherein the conditions to activate the at least one symbol are defined by a user.

\* \* \* \* \*